US010939439B2

(12) United States Patent
Kato et al.

(10) Patent No.: US 10,939,439 B2
(45) Date of Patent: Mar. 2, 2021

(54) RADIO COMMUNICATION SYSTEM, BASE STATION AND RADIO COMMUNICATION METHOD

(71) Applicant: PANASONIC INTELLECTUAL PROPERTY MANAGEMENT CO., LTD., Osaka (JP)

(72) Inventors: Osamu Kato, Fukuoka (JP); Hiroaki Asano, Kanagawa (JP); Hideki Kanemoto, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/553,686

(22) Filed: Aug. 28, 2019

(65) Prior Publication Data
US 2020/0077397 A1 Mar. 5, 2020

(30) Foreign Application Priority Data

Aug. 30, 2018 (JP) .............................. JP2018-161635

(51) Int. Cl.
*H04W 72/04* (2009.01)
(52) U.S. Cl.
CPC ..... *H04W 72/0453* (2013.01); *H04W 72/042* (2013.01); *H04W 72/0493* (2013.01)
(58) Field of Classification Search
CPC ........... H04W 72/0453; H04W 72/042; H04W 72/0493
USPC .......................................................... 370/329
See application file for complete search history.

(56) References Cited

U.S. PATENT DOCUMENTS

| 10,455,576 | B2* | 10/2019 | Kato ..................... H04W 16/14 |
| 2006/0211426 | A1* | 9/2006 | Costa .................... H04W 16/00 455/450 |
| 2012/0026892 | A1* | 2/2012 | Nakao ................... H04L 1/1861 370/242 |
| 2012/0089880 | A1* | 4/2012 | Nakao ................... H04L 5/0007 714/748 |
| 2016/0134403 | A1* | 5/2016 | Xiong ............... H04W 72/0446 370/329 |
| 2016/0182199 | A1* | 6/2016 | Webb .................... H04L 5/0053 370/329 |
| 2017/0105206 | A1* | 4/2017 | Maattanen ............ H04L 5/0091 |

(Continued)

OTHER PUBLICATIONS

Anass Benjebbour et. al., "5G Radio Access Technology," 5G Laboratory, Research Laboratories, NTT DOCOMO Technical Journal 17(4), Apr. 2016, 17 pages.

(Continued)

*Primary Examiner* — Christopher R Crompton
(74) *Attorney, Agent, or Firm* — Seed IP Law Group LLP

(57) ABSTRACT

A base station holds information on uplink radio resources which has been allocated to at least one already connected communication terminal for performing radio communication using a high frequency with the base station, receives a notification of participation in a radio communication system from a new communication terminal, and allocates unallocated uplink radio resources using high frequencies to the new communication terminal based on the information on the uplink radio resources when received the notification of participation. The new communication terminal transmits data to the base station by using the allocated uplink radio resources.

20 Claims, 8 Drawing Sheets

(56) References Cited

U.S. PATENT DOCUMENTS

| | | | |
|---|---|---|---|
| 2018/0103415 A1* | 4/2018 | Jia | H04W 48/10 |
| 2018/0124771 A1* | 5/2018 | Mok | H04W 72/048 |
| 2018/0152857 A1* | 5/2018 | Johansson | H04L 5/0064 |
| 2018/0270722 A1* | 9/2018 | Kim | H04W 72/10 |
| 2019/0215790 A1* | 7/2019 | Kim | H04W 56/001 |
| 2020/0136766 A1* | 4/2020 | Xu | H04L 1/1819 |
| 2020/0229235 A1* | 7/2020 | Lu | H04W 74/08 |

OTHER PUBLICATIONS

Naoto Okubo et. al., "Overview of LTE Radio Interface and Radio Network Architecture for High Speed, High Capacity and Low Latency," Radio Access Network Development Department, NTT DOCOMO Technical Journal 13(1), Jun. 2011, 10 pages.

\* cited by examiner

RADIO COMMUNICATION SYSTEM, BASE STATION AND RADIO COMMUNICATION METHOD

BACKGROUND OF INVENTION

1. Field of the Invention

The present disclosure relates to a radio communication system, a base station and a radio communication method for performing radio communication using a high-frequency band.

2. Description of the Related Art

It is pointed out that radio communication conforming to 5G (5th generation mobile communication system) is required to satisfy the following three features. The first feature is "eMBB" (enhanced mobile broadband), which indicates high speed and large capacity, and is intended to further increase the communication speed of communication terminals. If the communication speed becomes high, it is expected that streaming of 4K or 8K video with higher definition than 4G (4th generation mobile communication system) becomes possible and the convenience of users will be improved.

The second feature is "mMTC" (massive Machine Type Communication), which indicates ultra-high volume terminals, and is intended to further increase system capacity (that is, simultaneous terminal capacity in a cell). If the system capacity is higher, not only smartphones or personal computers (PCs) but also many Internet of Things (IoT) devices may be connected to and communicated with the network.

The third feature is "URLLC" (Ultra-Reliable and Low Latency Communication), which indicates ultra-reliable low latency, and is intended for highly reliable communication quality and low latency communication. If "URLLC" is to be realized, for example, processing requiring real-time capability such as automatic operation or remote operation may be performed with confidence.

For example, in Anass Benjebbour, et. al. of 5G Laboratory, Research Laboratories, '5G Radio Access Technology', NTT DOCOMO Technical Journal, April 2016 referred to as Non-Patent Literature 1, in order to improve "mMTC" (in other words, the number of simultaneously connected terminals) which is the second feature described above, it is pointed out that Grant Free Access (GFA) is important as a method of designing a control channel which does not require control information. GFA is a channel access scheme that does not require prior permission to a base station, for example, when a terminal transmits data to the base station. In Naoto Okubo, et. al. of Radio Access Network Development Department, 'Overview of LTE Radio Interface and Radio Network Architecture for High Speed, High Capacity and Low Latency', NTT DOCOMO Technical Journal, June 2011 referred to as Non-Patent Literature 2, unlike GFA, a channel access scheme (that is, a random access scheme) that requires prior permission to a base station when a terminal transmits data to the base station is described.

Non-Patent Literature 1: Anass Benjebbour, et. al. of 5G Laboratory, Research Laboratories, '5G Radio Access Technology', NTT DOCOMO Technical Journal, April 2016

Non-Patent Literature 2: Naoto Okubo, et. al. of Radio Access Network Development Department, 'Overview of LTE Radio Interface and Radio Network Architecture for High Speed, High Capacity and Low Latency', NTT DOCOMO Technical Journal, June 2011

SUMMARY OF INVENTION

The above-described related art does not suggest a specific technical specification for satisfying "URLLC", which is the third feature described above, and does not practically exist. The GFA described above is considered to be effective for immediately performing uplink communication when data to be transmitted is prepared in a communication terminal. However, the GFA may minimize the latency due to the transmission waiting time, but in a case where GFA is performed on the same base station by a plurality of communication terminals, a collision of data transmitted from the plurality of communication terminals may occur when the data is received by the base station. For this reason, the probability that the data transmission in each communication terminal will become a communication error increases. In order to avoid such communication errors, techniques such as Automatic Repeat reQuest (ARQ) indicating automatic retransmission or continuous data transmission (that is, transmitting the same data at different timings multiple times) are required, but if these techniques are adopted, an increase in latency at the time of data transmission cannot be avoided. As described above, in the related art, there is a problem that it is difficult to realize communication that achieves both high reliability and low latency.

In view of the circumstances described above, the present disclosure aims unlimitedly to provide a radio communication system, a base station and a radio communication method that support realization of high-speed radio communication requiring real-time performance while achieving both high reliability and low latency in radio communication using a high-frequency band.

According to an aspect of the present disclosure, there is provided a radio communication system including: a base station; and at least one already connected communication terminal that is configured to perform a radio communication using a high frequency with the base station, wherein the base station holds information on uplink radio resources which has been allocated to the at least one already connected communication terminal, the base station receives a notification of participation in the radio communication system from a new communication terminal, and allocates unallocated uplink radio resources using the high frequency to the new communication terminal based on the information on the uplink radio resources when received the notification of participation, and the new wireless terminal transmits data to the base station by using the allocated uplink radio resources.

According to another aspect of the present disclosure, there is provided a base station included in a radio communication system, the base station including: a memory that holds information on uplink radio resources which has been allocated to at least one already connected communication terminal for performing a radio communication using a high frequency with the base station; a communication unit that receives a notification of participation in the radio communication system from a new communication terminal; and a radio resource management unit that allocates unallocated uplink radio resources using the high frequency to the new communication terminal based on the information on the uplink radio resources when the participation notification is received, wherein the communication unit transmits an instruction to the new communication terminal, the instruction indicating data transmission using the allocated uplink radio resources.

According to still another aspect of the present disclosure, there is provided a radio communication method in a radio communication system including a base station and at least one already connected communication terminal that is configured to perform a radio communication using a high frequency with the base station, the radio communication method including: by the base station, holding information on uplink radio resources which has been allocated to the at least one already connected communication terminal; by the base station, receiving a notification of participation in the radio communication system from a new communication terminal; by the base station, allocating unallocated uplink radio resources using the high frequency to the new communication terminal based on the information on the uplink radio resources when received the notification of participation; and by the new wireless terminal, transmitting data to the base station by using the allocated uplink radio resources.

According to the present disclosure, in radio communication using a high frequency band, it is possible to achieve both high reliability and low latency and to support realization of high-speed radio communication that requires real-time performance.

DESCRIPTION OF EMBODIMENTS

Hereinafter, with reference to drawings as appropriate, an embodiment specifically disclosing configurations and operations of a radio communication system, a base station and a radio communication method according to the present disclosure will be described in detail. However, the detailed description may be omitted if necessary. For example, detailed description of already well-known matters and redundant description of substantially the same configuration may be omitted. This is to avoid unnecessary redundancy in the following description and to facilitate understanding of those skilled in the related art. The accompanying drawings and the following description are provided for those skilled in the related art to fully understand the present disclosure and are not intended to limit the claimed subject matter thereto.

Embodiment 1

Figure 1:
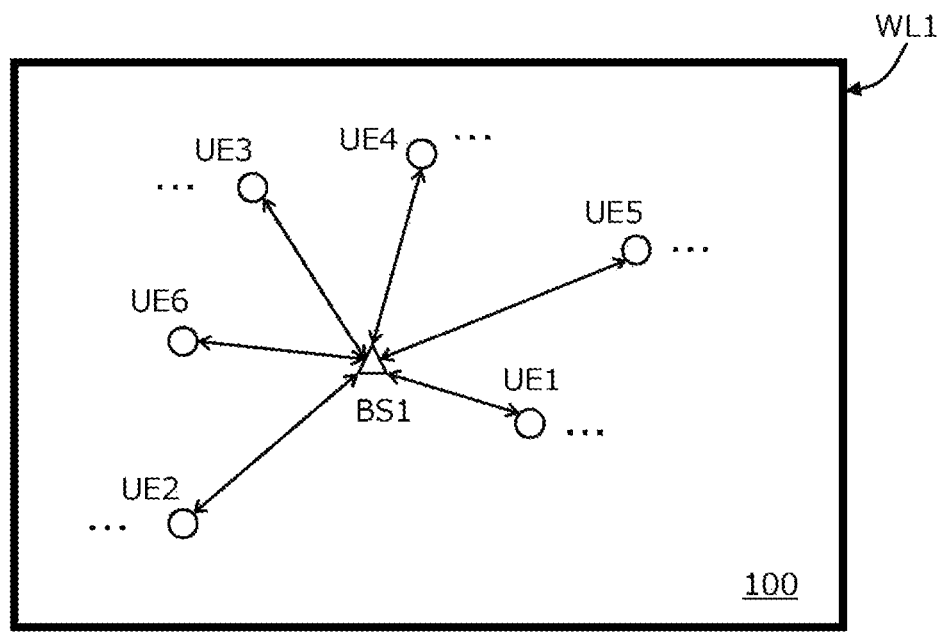
FIG. 1 is a schematic diagram showing an example of a layout in a factory in which a radio communication system is disposed according to Embodiment 1.

FIG. 1 is a schematic diagram showing an example of the layout of WL in a factory in which a radio communication system 100 is disposed according to Embodiment 1. In Embodiment 1, the radio communication system 100 is described as being disposed in a physically narrow communication area such as WL1 in a factory, but the communication area is not limited to the WL1 in a factory as long as the radio communication system 100 is disposed in the above-described communication area. The communication area may be a place (for example, a factory, an intersection, a construction site, a stadium such as a baseball stadium or a soccer stadium, or a large conference room such as an international conference hall) having a space volume where a fixed number of base stations can operate.

The radio communication system 100 includes a plurality of communication terminals UE1, UE2, UE3, UE4, UE5, and UE6, and a base station BS1. Although a total of six communication terminals UE1 to UE6 are illustrated in FIG. 1, the number of communication terminals connected to perform radio communication with the base station BS1 is not limited to six. Further, although only one base station BS1 in total is illustrated in FIG. 1, the number of base stations constituting the radio communication system 100 is not limited to one.

In the following embodiment, each of the plurality of communication terminals UE1 to UE5 (an example of already connected communication terminals) is already connected to perform radio communication with the base station BS1, and a use case when the communication terminal UE6 newly participates in the radio communication system 100 will be described as an example. When the communication terminal UE6 participates in the radio communication system 100, information on the communication terminal UE6 is input to the base station BS1 by an input operation of an administrator terminal (not shown) or the like, and the communication terminal UE6 is newly wirelessly connected with the base station BS1 to perform radio communication such as data communication.

In addition, in the following embodiment, as an example for realizing "URLLC" (communication achieving both high reliability and low latency), which is one of the three major features of 5G (5th generation mobile communication method) in the radio communication system 100, an operation procedure example for transmitting data (an example of data communication) from each communication terminal to the base station BS1 by using an uplink (UL) will be described.

In the radio communication system 100, a network is configured such that each of the communication terminals UE1 to UE6 and the base station BS1 can execute radio communication conforming to the same wireless standard system. When uplink radio resources (for example, resource block (RB) described later) specified by the base station BS1 are allocated in advance, each of the communication terminals UE1 to UE6 does not obtain prior permission for data transmission to the base station BS1 and starts radio communication with the base station BS1. In other words, in Embodiment 1, when uplink radio resources are allocated in advance (that is, before transmission of UL transmission user data) from the base station BS1, each of the communication terminals UE1 to UE6 can perform data communication with the base station BS1 in grant free access (GFA) by using the uplink radio resources.

Here, the resource block is a radio resource used in radio communication between each of the communication terminals UE1 to UE6 and the base station BS1, specifically, the smallest allocable radio resource, which is divided by a frequency axis and a time axis (for example, time slot) of the radio frequency (for example, subcarrier frequency) used for radio communication. A specific example of a resource block will be described later.

As described above, in Embodiment 1, an example of communication from the communication terminal to the base station BS1 via the uplink is described, and therefore, the above-described resource block means "uplink resource block". Although the details are not described in Embodiment 1, the resource block in the communication from the base station BS1 to the communication terminals UE1 to UE6 via a downlink may be the same as or different from the uplink resource block.

The communication terminals UE1 to UE6 and the base station BS1 may conform to radio access technologies (for example, radio communication standards and radio frequencies) that can be adopted by each. However, the features of the radio communication system according to the present disclosure and the effects based on the features are greatly exhibited when the communication terminals UE1 to UE6 and the base station BS1 use the same frequency band, as an example of a case where data collision (interference) may occur when UL transmission user data (see later) is simultaneously transmitted from each of the communication terminals UE1 to UE6 to the base station BS1. For this reason, in the following Embodiment 1, a high-frequency band (for example, 28 GHz band under consideration for use in 5G (5th generation mobile communication system)) will be exemplified and described as a wireless standard system used for radio communication of the radio communication system 100.

For example, the cell radius of the base station BS1 is 10 m to 50 m, which is relatively smaller than the cell radius of the macro cell provided in Long Term Evolution (LTE) or LTE-Advanced. The radio access technology that can be adopted by the base station BS1 may be various and may exist in multiple types. The communicable range of the base station BS1 may be determined, for example, according to the position of the base station BS1 and the cell radius.

In addition, the network configured with the radio communication system 100 may not be a C/U separation network, or may be a C/U separation network. Embodiment 1 exemplifies a network which is not a C/U separation type. That is, in the radio communication system 100, communication of control data and communication of user data are performed by the same base station.

The base station BS1 is a small cell base station capable of providing a high-speed throughput based on the 28 GHz band described above (see FIG. 1). Each of the communication terminals UE1 to UE6 communicates control data and communicates user data with the base station BS1. The control data includes data related to C (Control)-plane. The user data includes data related to U (User)-plane. The user data includes, for example, image data (for example, moving image, still image), audio data, sensing data (for example, temperature information, pressure information) and may include data for which highly reliable and low latency data communication is strongly desired. Specific examples of data for which highly reliable and low latency data communication (URLLC) is desired include, for example, still images that show information on the progress status of each process or the presence or absence of abnormalities in a factory, moving images around driving points captured by a camera mounted on an autonomous driving vehicle, voice data to be translated automatically, various sensing data for automatically controlling various equipment in a factory, and the like.

C-plane is a communication protocol for communicating control data of call connection and wireless resource allocation in radio communication. U-plane is a communication protocol for actually performing communication (for example, video communication, voice communication, and data communication) between a communication terminal and a base station by using allocated radio resources.

Figure 2:
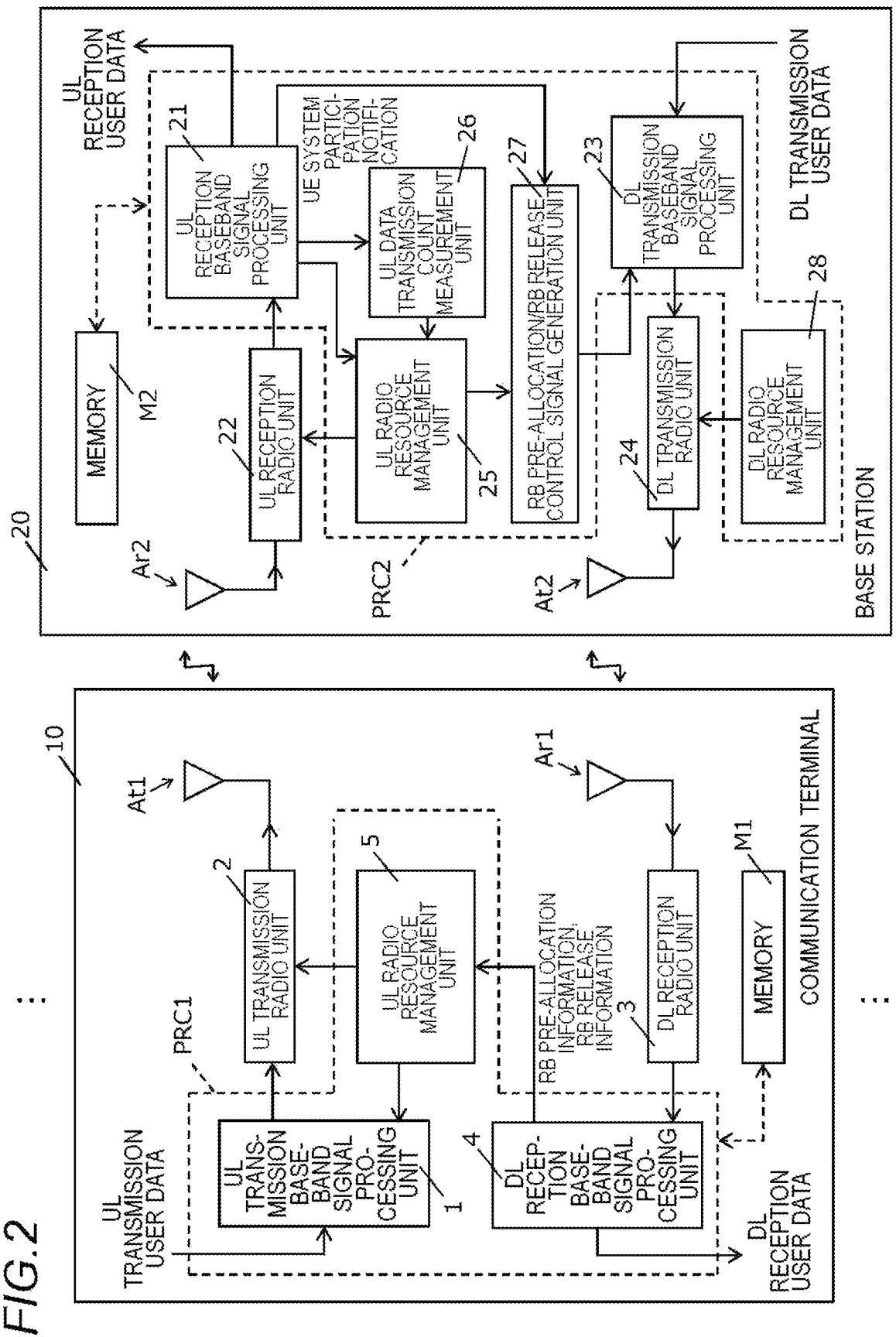
FIG. 2 is a block diagram showing an example of an internal configuration of a communication terminal and a base station according to Embodiment 1.

FIG. 2 is a block diagram showing in detail an internal configuration example of a communication terminal 10 and a base station 20 according to Embodiment 1. Each of the communication terminals UE1 to UE6 shown in FIG. 1 has the same configuration as the communication terminal 10, and the base station BS1 shown in FIG. 1 has the same configuration as the base station 20.

The communication terminal 10 includes a processor PRC1, a memory M1, a UL transmission radio unit 2 to which a transmission antenna At1 is connected, and a DL reception radio unit 3 to which a reception antenna Ar1 is connected. The communication terminal 10 is connected to perform radio communication with base station 20 in WL1 in a factory, for example, and specifically, is a smartphone, a tablet terminal, a personal digital assistant (PDA) carried by users, or an IoT (Internet of Things) device such as a stationary sensor or surveillance camera.

The processor PRC1 is configured by using, for example, a central processing unit (CPU), a digital signal processor (DSP), or a field programmable gate array (FPGA). Specifically, the processor PRC1 includes an uplink (UL) transmission baseband signal processing unit 1, a downlink (DL) reception baseband signal processing unit 4, and a UL radio resource management unit 5. In other words, the UL transmission baseband signal processing unit 1, the DL reception baseband signal processing unit 4, and the UL radio resource management unit 5 can be realized as a functional configuration in which the processor PRC1 cooperates with the memory M1.

The UL transmission baseband signal processing unit 1 inputs UL transmission user data from a UL transmission user data generation unit (not shown) such as an application executed in the communication terminal 10. The UL transmission user data may be user data such as, for example, captured image data or music data or may be control data, and identification information of a transmission source (that is, the communication terminal 10) is stored in a header area. The UL transmission baseband signal processing unit 1 performs various types of signal processing (so-called baseband signal processing) in the baseband with respect to the UL transmission user data according to the control signal from the UL radio resource management unit 5 to generate a transmission signal of the baseband. The baseband processing includes, for example, encoding processing, digital analog (DA) conversion for converting a digital signal into an analog signal, and modulation processing of transmission data in accordance with modulation coding scheme (MCS). The UL transmission baseband signal processing unit 1 outputs the transmission signal after baseband processing to the UL transmission radio unit 2.

The UL transmission radio unit 2 receives the transmission signal from the UL transmission baseband signal processing unit 1. The UL transmission radio unit 2 converts the transmission signal from the UL transmission baseband signal processing unit 1 into a transmission radio frequency (RF) signal in a high-frequency band (for example, 28 GHz band) under consideration for use in 5G (5th generation mobile communication system) described above according to a specification signal of the uplink radio resource (for example, uplink resource block) from the UL radio resource management unit 5. In addition, the UL transmission radio unit 2 performs transmission power amplification processing on the transmission RF signal up to a predetermined level that does not exceed the maximum level of transmission power compliant with the radio communication standard. The UL transmission radio unit 2 transmits the transmission RF signal subjected to the amplification processing from the transmission antenna At1.

The DL reception radio unit 3 receives a reception radio frequency (RF) signal (for example, a transmission RF signal transmitted from the base station 20) received by the reception antenna Ar1. The DL reception radio unit 3 performs amplification processing of the reception power of the input reception RF signal, and further converts the reception RF signal into a reception signal of the baseband. The DL reception radio unit 3 outputs the reception signal of the baseband to the DL reception baseband signal processing unit 4.

The DL reception baseband signal processing unit 4 receives the reception signal from the DL reception radio unit 3. The DL reception baseband signal processing unit 4 performs various types of signal processing (so-called baseband signal processing) in the baseband with respect to the received signal of the input baseband to generate DL reception user data. The baseband processing includes, for example, decoding processing, analog digital (AD) conversion for converting an analog signal into a digital signal, and demodulation processing of a received signal in accordance with modulation coding scheme (MCS). The DL reception baseband signal processing unit 4 outputs DL reception user data after baseband processing.

In addition, the DL reception baseband signal processing unit 4 acquires instruction information (hereinafter, referred to as "RB pre-allocation information") indicating that an uplink radio resource is newly allocated by the base station 20 for communication of the communication terminal 10, based on a baseband processing result of the input received signal. Further, the DL reception baseband signal processing unit 4 acquires instruction information (hereinafter, referred to as "RB release information") for releasing the uplink resource block already allocated for communication of the communication terminal 10 by the base station 20, based on the baseband processing result of the input received signal. In a case where the DL reception baseband signal processing unit 4 acquires RB prior information or RB release information, the DL reception baseband signal processing unit 4 outputs RB prior information or RB release information to the UL radio resource management unit 5.

The UL radio resource management unit 5 manages management information (an example of information on uplink radio resources) of radio resources related to the uplink of the current communication terminal 10 based on the input from the DL reception baseband signal processing unit 4. For example, the UL radio resource management unit 5 itself holds, or holds in the memory M1, an uplink radio resource table (not shown) that defines management information of radio resources related to the uplink. In other words, in radio communication from the communication terminal 10 via the uplink, the UL radio resource management unit 5 manages which radio resource (that is, uplink resource block) is currently allocated by the base station 20 or which radio resource is not currently allocated.

For example, when RB pre-allocation information is input from the DL reception baseband signal processing unit 4, the UL radio resource management unit 5 may manage the contents of the latest uplink radio resource table by updating the above-described uplink radio resource table. The UL radio resource management unit 5 generates a specification signal for specifying the allocated uplink resource block specified in the RB pre-allocation information and outputs the generated signal to the UL transmission radio unit 2.

For example, when RB release information is input from the DL reception baseband signal processing unit 4, the UL radio resource management unit 5 may manage the contents of the latest uplink radio resource table by updating the above-described uplink radio resource table. The UL radio resource management unit 5 generates a specification signal for releasing the specification of the released uplink resource block specified in the RB release information and outputs the generated signal to the UL transmission radio unit 2.

The memory M1 has, for example, a random access memory (RAM) as a work memory used at the time of processing of the communication terminal 10, and a read only memory (ROM) that stores a program and data that define the operation of the communication terminal 10. Data or information generated or acquired by each unit of the communication terminal 10 is temporarily stored in the RAM. A program that defines the operation of the communication terminal 10 (for example, steps (processes) to be executed by the communication terminal 10) is written in the ROM.

The base station 20 includes a processor PRC2, a memory M2, a UL reception radio unit 22 to which the reception antenna Ar2 is connected, and a DL transmission radio unit 24 to which the transmission antenna At2 is connected. The base station 20 is, for example, a base station capable of performing radio communication with each of the communication terminals UE1 to UE6 in WL1 in the factory.

The processor PRC2 is configured by using, for example, a CPU, a DSP or an FPGA. Specifically, the processor PRC2 includes a UL reception baseband signal processing unit 21, a DL transmission baseband signal processing unit 23, a UL radio resource management unit 25, a UL data transmission count measurement unit 26, and an RB pre-allocation/RB release control signal generation unit 27. In other words, the UL reception baseband signal processing unit 21, the DL transmission baseband signal processing unit 23, the UL radio resource management unit 25, the UL data transmission count measurement unit 26, and the RB pre-allocation/RB release control signal generation unit 27 can be realized as a functional configuration in which the processor PRC2 cooperates with the memory M2.

The UL reception baseband signal processing unit 21 performs various kinds of signal processing (so-called baseband signal processing) in the baseband with respect to the reception signal of the baseband (see later) from the UL reception radio unit 22 to generate UL reception user data. This baseband processing includes, for example, decoding processing, AD conversion for converting an analog signal into a digital signal, and demodulation processing of a received signal in accordance with MCS. The UL reception baseband signal processing unit 21 outputs UL reception user data after baseband processing.

In addition, the UL reception baseband signal processing unit 21 acquires a notification of participation indicating that the communication terminal 10 has newly joined the radio communication system 100 based on the baseband processing result of the input received signal. In a case where the UL reception baseband signal processing unit 21 acquires the notification of participation, the UL reception baseband signal processing unit 21 outputs the notification of participation to the UL radio resource management unit 25 and the RB pre-allocation/RB release control signal generation unit 27, respectively.

In addition, the UL reception baseband signal processing unit 21 outputs information indicating that UL transmission user data has been transmitted from the communication terminal 10 to the base station 20 to the UL data transmission measurement unit 26 based on the baseband processing result of the input received signal. The information input to the UL data transmission measurement unit 26 at least includes information indicating that UL transmission user data has been transmitted from the communication terminal 10 to the base station 20, and identification information of the communication terminal 10.

The UL reception radio unit 22 as an example of a communication unit receives a reception RF signal (for example, a transmission RF signal transmitted from the communication terminal 10) received by the reception antenna Ar2. The UL reception radio unit 22 performs amplification processing of the reception power of the input reception RF signal and further converts the reception RF signal into a reception signal of the baseband according to the specification signal of the uplink radio resource (for example, identification information and uplink radio resource of the communication terminal) from the UL radio resource management unit 25. The UL reception radio unit 22 outputs the reception signal of the baseband to the UL reception baseband signal processing unit 21.

The DL transmission baseband signal processing unit 23 receives DL transmission user data transmitted from the base station 20 to the communication terminal 10. The DL transmission user data may be user data such as, for example, captured image data or music data or may be control data, and identification information of a transmission source (that is, the base station 20) is stored in a header area. The DL transmission baseband signal processing unit 23 performs various kinds of signal processing (so-called baseband signal processing) in the baseband with respect to the DL transmission user data or the content of the control signal from the RB pre-allocation/RB release control signal generation unit 27 according to the control signal from RB pre-allocation/RB release control signal generation unit 27 to generate a transmission signal of the baseband. The baseband processing includes, for example, encoding processing, digital analog (DA) conversion for converting a digital signal into an analog signal, and modulation processing of transmission data in accordance with modulation coding scheme (MCS). The DL transmission baseband signal processing unit 23 outputs the transmission signal after baseband processing to the DL transmission radio unit 24.

The DL transmission radio unit 24 receives the transmission signal from the DL transmission baseband signal processing unit 23. The DL transmission radio unit 24 converts the transmission signal from the DL transmission baseband signal processing unit 23 into a transmission radio frequency (RF) signal in a high-frequency band (for example, 28 GHz band) under consideration for use in 5G (5th generation mobile communication system) described above according to a specification signal of the downlink radio resource (for example, downlink resource block) from the DL radio resource management unit 28. In addition, the DL transmission radio unit 24 performs transmission power amplification processing on the transmission RF signal up to a predetermined level that does not exceed the maximum level of transmission power compliant with the radio communication standard. The DL transmission radio unit 24 transmits the transmission RF signal subjected to the amplification processing from the transmission antenna At2.

The UL radio resource management unit 25 manages management information (an example of information on uplink radio resources) of radio resources related to the uplink allocated to each communication terminal currently connected to the base station 20 based on the input from the UL reception baseband signal processing unit 21. The UL radio resource management unit 25 generates a specification signal (see the above) for specifying an uplink resource block already allocated to communication terminal 10 and outputs the generated signal to the UL reception radio unit 22.

In addition, when the UL radio resource management unit 25 acquires a notification of participation that the communication terminal 10 has newly joined the radio communication system 100, the UL radio resource management unit 25 searches and extracts an uplink radio resource to be newly allocated to the communication terminal 10 to be a target thereof. The UL radio resource management unit 25 may appropriately manage the contents of the latest radio resource management information by allocating the extracted uplink resource radio resource to the communication terminal 10 that is a target of a participation notification and updating the management information of the radio resource for the uplink. Further, the UL radio resource management unit 25 outputs an instruction indicating that a radio resource related to the uplink has been allocated to the RB pre-allocation/RB release control signal generation unit 27 including identification information of the target communication terminal 10 and information on the uplink radio resource (uplink resource block).

In addition, the UL radio resource management unit 25 receives the output from the UL data transmission count measurement unit 26 and recognizes whether frequency information of data transmission from the communication terminal 10 to which an uplink resource block has already been allocated satisfies a release establishment condition of the uplink resource block based on the output. In a case where the UL radio resource management unit 25 recognizes that the release establishment condition of the uplink resource block is satisfied, the UL radio resource management unit 25 outputs a release instruction of the uplink resource block to the RB pre-allocation/RB release control signal generation unit 27.

In addition, the UL radio resource management unit 25 receives the measurement result from the UL data transmission count measurement unit 26 and recognizes whether or not frequency information of data transmission from the communication terminal 10 in which the uplink resource block has already been released satisfies a pre-allocation establishment condition of the uplink resource block, based on the measurement result. In a case where the UL radio resource management unit 25 recognizes that the pre-allocation establishment condition of the uplink resource block is satisfied, the UL radio resource management unit 25 outputs a pre-allocation instruction of the uplink resource block to the RB pre-allocation/RB release control signal generation unit 27.

Here, when an uplink resource block is newly allocated to the communication terminal 10 that satisfies the pre-allocation establishment condition, the uplink resource block may be the same as a previously released uplink resource block or may be a different uplink resource block. This is because, at the timing when an uplink resource block is allocated to the communication terminal 10 again, it is not guaranteed that the previously allocated uplink resource block is vacant.

Every time UL transmission user data is transmitted from the communication terminal 10 to the base station 20, the UL data transmission count measurement unit 26 acquires information indicating that the transmission has been made from the UL reception baseband signal processing unit 21. The UL data transmission count measurement unit 26 measures what frequency the communication terminal 10 having which identification information is transmitting data based on the information from the UL reception baseband signal processing unit 21 and outputs the measurement result to the UL radio resource management unit 25.

The RB pre-allocation/RB release control signal generation unit 27 generates a control signal for pre-allocating an uplink resource block to the target communication terminal 10 according to the instruction from the UL radio resource management unit 25 and outputs the control signal to the DL transmission baseband signal processing unit 23.

Specifically, in a case where the RB pre-allocation/RB release control signal generation unit 27 acquires information indicating that an uplink resource block is newly allocated to the communication terminal 10, from the UL radio resource management unit 25, the RB pre-allocation/RB release control signal generation unit 27 generates a control signal including information indicating that an uplink resource block has been allocated, identification information of the target communication terminal 10, and information on the uplink resource block and outputs the control signal to the DL transmission baseband signal processing unit 23.

In addition, in a case where the RB pre-allocation/RB release control signal generation unit 27 acquires an uplink resource block release instruction from the UL radio resource management unit 25, the RB pre-allocation/RB release control signal generation unit 27 generates a control signal including information indicating that the uplink resource block has been released, identification information of the target communication terminal 10, and information on the uplink resource block and outputs the control signal to the DL transmission baseband signal processing unit 23.

In addition, in a case where the RB pre-allocation/RB release control signal generation unit 27 acquires a pre-allocation instruction from the UL radio resource management unit 25, the RB pre-allocation/RB release control signal generation unit 27 generates a control signal including information indicating that an uplink resource block has been pre-allocated, identification information of the target communication terminal 10, and information on the uplink resource block and outputs the control signal to the DL transmission baseband signal processing unit 23.

The DL radio resource management unit 28 manages management information (an example of information on downlink radio resources) of radio resources on downlinks allocated to each communication terminal currently connected to the base station 20. The DL radio resource management unit 28 generates a specification signal (see the above) for specifying a downlink resource block used for communication on the downlink with the communication terminal 10 and outputs the generated signal to the DL transmission radio unit 24.

The memory M2 has, for example, a RAM as a work memory used at the time of processing of the base station 20, and a ROM that stores a program and data that define the operation of the base station 20. Data or information generated or acquired by each unit of the base station 20 is temporarily stored in the RAM. A program that defines the operation of the base station 20 (for example, the steps (processes) to be executed by the base station 20) is written in the ROM.

Figure 3:
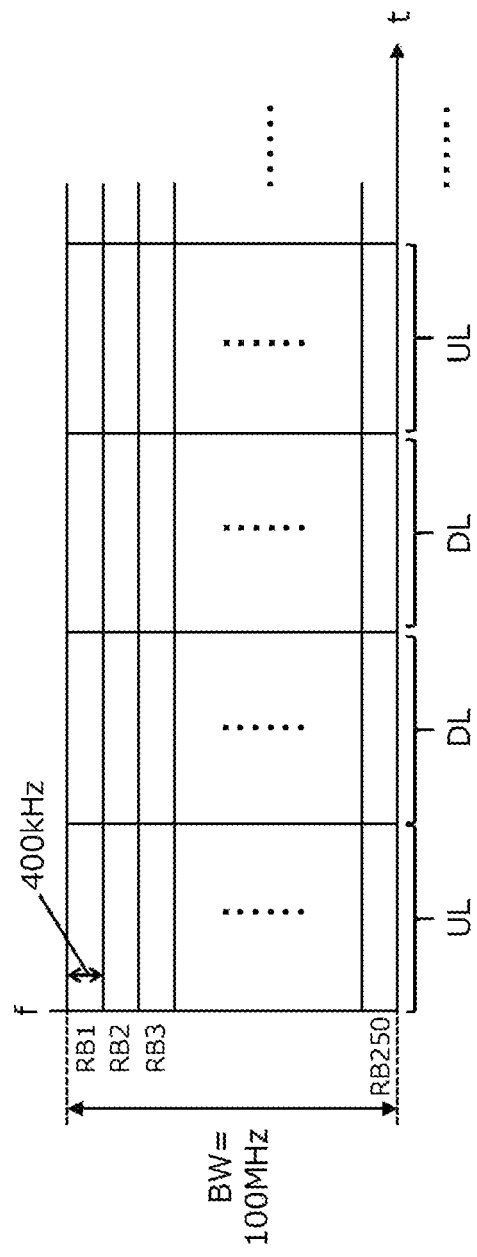
FIG. 3 shows an example in which data communication to the base station of the communication terminal is alternately switched between transmission and reception according to TDD.
Figure 4:
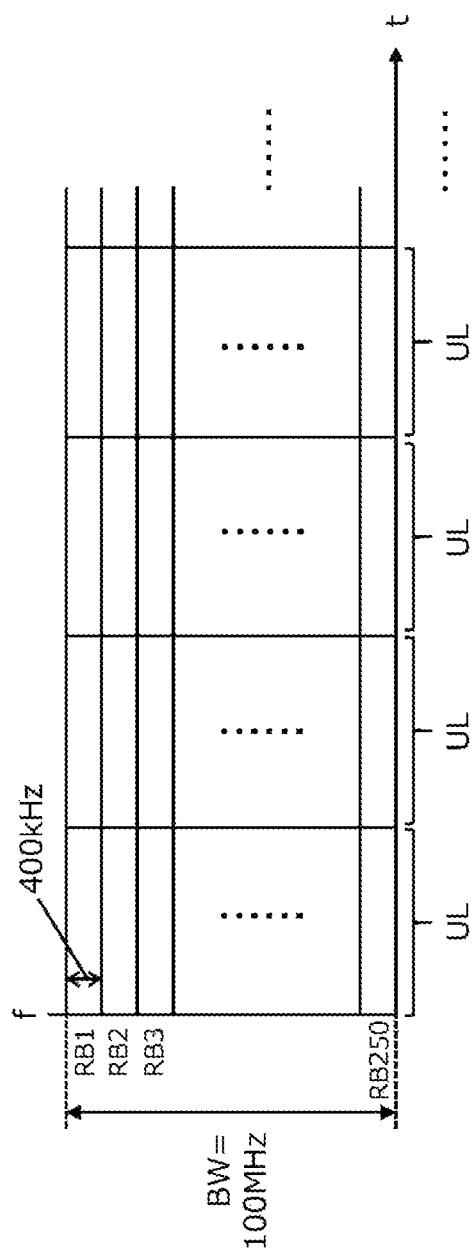
FIG. 4 shows an example in which data communication to the base station of the communication terminal is performed by a UL dedicated channel.

Next, a specific example of a system design that can be applied to the radio communication system 100 according to Embodiment 1 will be considered and described with reference to FIGS. 3 and 4. FIG. 3 is a diagram showing an example in which data communication of the communication terminal to the base station is alternately switched between transmission and reception according to TDD. FIG. 4 is a diagram showing an example in which data communication of the communication terminal to the base station is performed by a UL dedicated channel.

In the radio communication system 100 according to Embodiment 1, it is assumed that the high-frequency band used by the base station 20 and each of the communication terminals 10 is 5G (5th generation mobile communication system). In this case, for example, a radio bandwidth (BW) may be 100 [MHz], and a subcarrier separation (SCS) may be 30 [kHz]. Therefore, it is considered that about 3000 subcarriers may be established even in consideration of securing the surplus of the frequencies. In LTE, the subcarrier separation is 15 kHz.

If one resource block is defined to be composed of 12 subcarriers, as shown in FIGS. 3 and 4, there are 3000/12=250 resource blocks (see RB1 to RB250). In radio communication using one resource block, for example, a frequency band of about 400 kHz can be used.

Assuming that one resource block is "12 subcarriers×1 TTI (Transmission Time Interval, that is, a time length of 14 symbols)", if the subcarrier separation (SCS) is 30 kHz, then TTI=0.5 msec. Since 12 subcarriers×1 TTI corresponds to 168 symbols/0.5 [msec], for example, if multi input multi output (MIMO) is not used, the modulation scheme is quadrature phase shift keying (QPSK), and the error correction coefficient=½, a throughput of 336 kbps will be obtained.

Therefore, considering that one resource block (12 subcarriers) is fixedly allocated to the communication terminal 10 performing radio communication for realizing URLLC in Embodiment 1, since the number of resource blocks is 250, a total of 250 communication terminals 10 can be accommodated in the base station 20 with a wireless bandwidth of 100 MHz.

Further, since a throughput of 336 [kbps] can be obtained, the communication terminal 10 transmits data to the base station 20 at 168 [kbits]=21 [kbytes] per 1 TTI (that is, 0.5 [msec]). Since sensing data such as temperature information can be transmitted if the data is about 21 [bytes] or a multiple thereof, transfer of such sensing data may be completed instantly in several TTI times. In addition, data may be transmitted to the base station 20 at 336 [kbits]=21 [kbytes] per second. At this data transmission rate, for example, considering that the image data obtained by compressing captured image data captured by a digital camera or a smartphone is approximately 40 to 100 [kbyte], the communication terminal 10 can realize high-speed data transmission such that about one sheet of image data is transmitted every several seconds as UL transmission user data.

In addition, assuming that the cell radius covered by one base station 20 is 9 [m], the cell radius is 9×9×π=250 [m²]. Therefore, according to the radio communication system 100 according to Embodiment 1, it is possible to satisfy the requirement of 5G (5th generation mobile communication system) where 250 communication terminals/250 [m²]=1 communication terminal/1 [m²]. As this numerical example shows, it can be seen that in the base station 20 according to Embodiment 1, the means of pre-allocation of resource blocks can ensure practical performance in terms of the number of accommodated terminals and throughput per communication terminal in a radio communication system that requires URLLC.

In the communication example of FIG. 3, an example in which one transmission period and two reception periods in the communication terminal 10 are switched to time division as a basic unit and repeated according to the time division duplex (TDD) scheme is shown. The ratio of the transmission period and the reception period is not limited to the example of FIG. 3. In general, in a case where the transmission period and the reception period are switched to time division, the communication terminal 10 cannot transmit data to the base station 20 during the reception period, and it is difficult to realize URLLC. However, for example, in high-frequency band radio communication such as 5G (5th generation mobile communication system), since each transmission period and reception period can be designed to be extremely short (for example, the transmission period and reception period in LTE are ½ to ⅛ [msec] compared to 1 [msec]), the communication terminal 10 is considered to be capable of communication with relatively low latency even if the reception period exists. In other words, URLLC may be considered to be realized.

On the other hand, in the communication example of FIG. 4, it is shown that data transmission from the communication terminal 10 to the base station 20 may be realized with low latency by using a dedicated channel (hereinafter, "UL dedicated channel") when using uplink for data transmission from the communication terminal 10 to the base station 20. Currently, in 5G (5th generation mobile communication system), it is considered that the establishment of a UL dedicated channel is necessary as a supplemental uplink (SUL) at the time of data transmission from the communication terminal 10 to the base station 20. Therefore, since the UL dedicated channel can be used at the time of data transmission from the communication terminal 10 to the base station 20, it is considered that data transmission from the communication terminal 10 to the base station 20 can be performed with low latency compared to the communication example shown in FIG. 3. In other words, URLLC may be considered to be realized.

Figure 5:
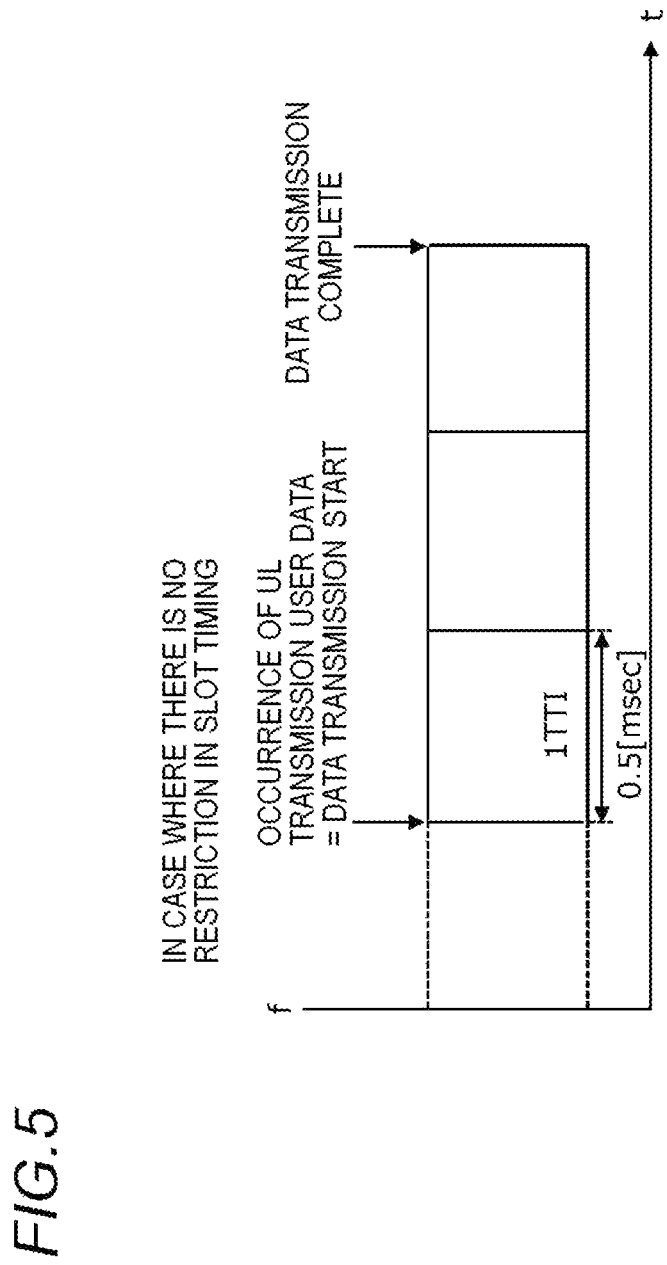
FIG. 5 shows an example of a transmission timing in the case where there is no restriction in a slot timing in a radio communication scheme.
Figure 6:
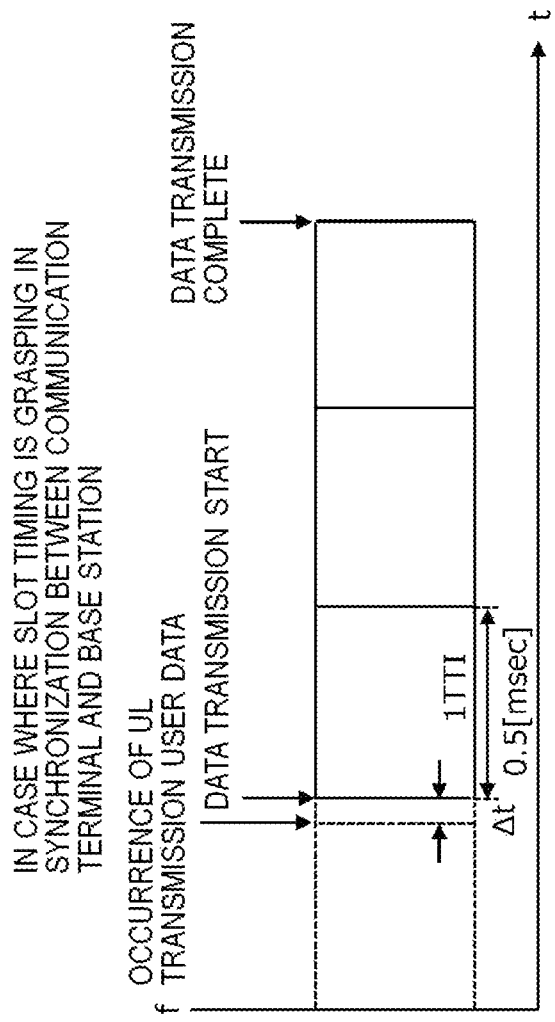
FIG. 6 shows an example of a transmission timing in the case where the slot timing is restricted in the radio communication scheme.

FIG. 5 is a diagram showing an example of a transmission timing in a case where there is no restriction in slot timing in the radio communication system. FIG. 6 is a diagram showing an example of a transmission timing in a case where slot timing is restricted in the radio communication system.

In the radio communication system 100 according to Embodiment 1, when the participation of the communication terminal 10 in the radio communication system 100 is recognized in the base station 20, an uplink resource block to be used by the communication terminal 10 for data transmission is allocated in advance in the base station 20. Then, information indicating that an uplink resource block has been allocated from the base station 20 is transmitted to the communication terminal 10. The communication terminal 10 may recognize that the use of the uplink resource block is permitted by the base station 20 according to the information from the base station 20. Thereby, the communication terminal 10 may grasp and set the uplink resource block to be used for data transmission before the start of data transmission (more specifically, UL transmission user data).

Therefore, as shown in FIG. 5, if there is no restriction in the time slot corresponding to the radio communication standard between the communication terminal 10 and the base station 20, the communication terminal 10 may start transmission of UL transmission user data immediately upon the occurrence of UL transmission user data, by using the uplink resource block allocated by the base station 20. In addition, the communication terminal 10 may repeat and continue transmission of UL transmission user data for every TTI until transmission of UL transmission user data is completed, by using the same uplink resource block. In FIGS. 5 and 6, one TTI is, for example, 0.5 [msec].

In addition, as shown in FIG. 6, in a case where there is a restriction in a time slot corresponding to the radio communication standard between the communication terminal 10 and the base station 20, the communication terminal 10 may wait for Δt to elapse from the time when the UL transmission user data is generated to the time when a specified transmission timing is reached and execute data transmission by using the uplink resource block allocated by the base station 20 when the Δt has elapsed. Δt is a short period as compared to 1 TTI (that is, 0.5 [msec]). Similarly, the communication terminal 10 may continue transmission of UL transmission user data until transmission of UL transmission user data is completed by using the same uplink resource block.

Figure 7:
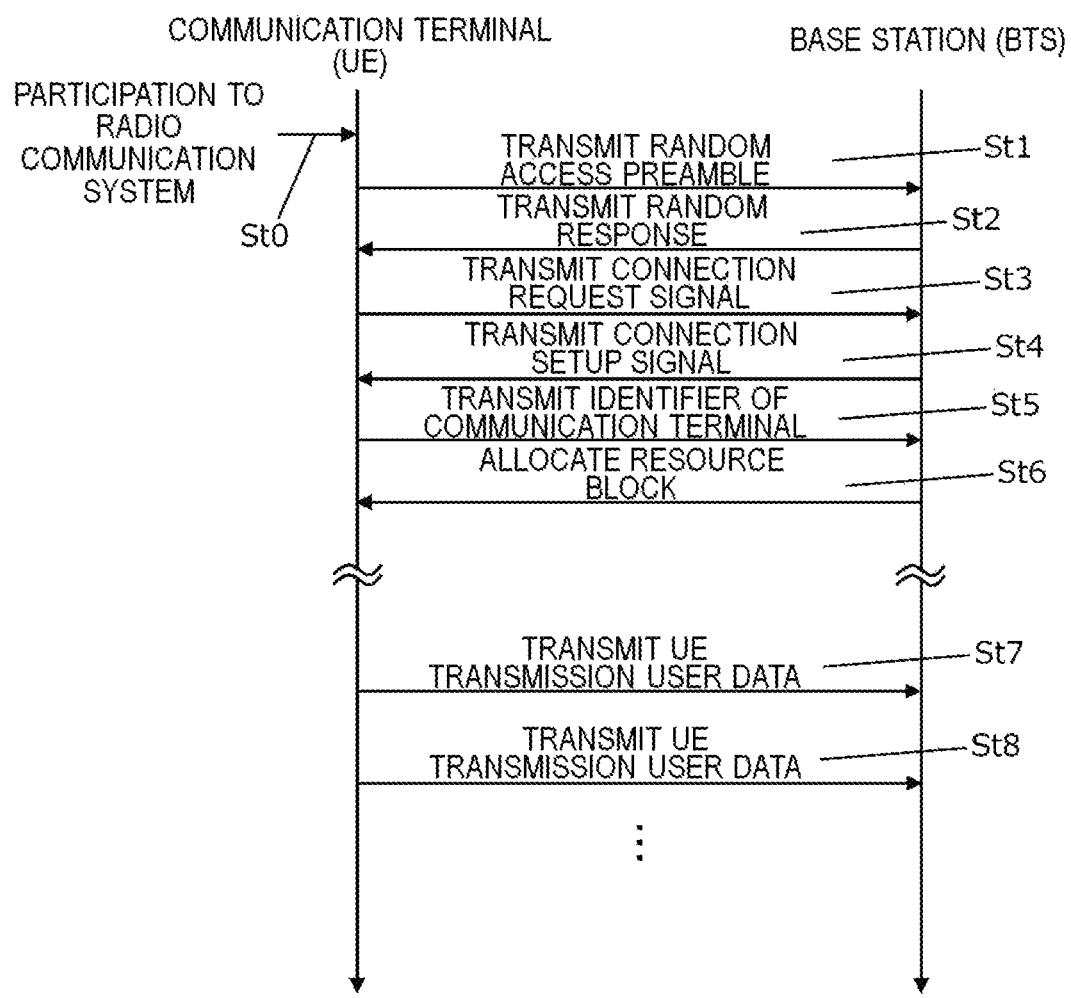
FIG. 7 is a sequence diagram showing examples of operation procedures related to data communication of the communication terminal and the base stations according to Embodiment 1, in chronological order.

Next, in the radio communication system 100 according to Embodiment 1, an operation procedure example at the time of data transmission from the communication terminal 10 to the base station 20 via the uplink will be described with reference to FIG. 7. FIG. 7 is a sequence diagram showing an operation procedure example related to data communication of the communication terminal 10 and the base station 20 according to Embodiment 1 in time series. In FIG. 7, the communication terminal is described as "UE" (User Equipment) for convenience, and the base station is described as "BTS" (Base Station). In addition, to make the description of FIG. 7 easy to understand, the base station 20 will be described assuming that the uplink resource block on the UL dedicated channel is allocated to the communication terminal 10 to be a target of participation in the radio communication system 100 (see FIG. 4).

In FIG. 7, when the processing of instructing the participation of the communication terminal 10 in the radio communication system 100 is executed by the operation of a user (St0), the communication terminal 10 transmits a predetermined random access preamble to the base station 20 by the Physical Random Access Channel (PRACH) (St1). When receiving the predetermined random access preamble transmitted by the PRACH, the base station 20 recognizes the presence of the communication terminal 10 that wants to transmit data.

The base station 20 determines which uplink resource block on the Up Link Shared Channel (UL-SCH) to be used for transmission to the communication terminal 10 that has transmitted the predetermined random access preamble in step St1. The base station 20 returns a response message (that is, a random access response) including the information of the uplink resource block on the determined UL-SCH by the Down Link Shared Channel (DL-SCH) (St2).

When receiving the random access response returned in step St2, the communication terminal 10 transmits a connection request signal including identification information of the communication terminal 10 to the base station 20 by the UL-SCH using the uplink resource block on the UL-SCH specified in the random access response (St3).

The base station 20 returns a connection setup signal corresponding to the connection request signal to the communication terminal 10 corresponding to the identification information included in the connection request signal transmitted in step St3 by the DL-SCH (St4).

When receiving the connection setup signal in step St4, the communication terminal 10 transmits identification information (for example, an identifier) of the communication terminal 10 to the base station 20 by the UL-SCH (St5).

When determining that the identification information of the communication terminal 10 transmitted in step St5 matches the identification information of the communication terminal 10 included in the connection request signal transmitted in step St3, the base station 20 allocates the uplink resource block of the UL dedicated channel to the communication terminal 10 (St6). In addition, after assigning the uplink resource block on the UL dedicated channel, the base station 20 returns information indicating which UL dedicated channel uplink resource block is assigned to the communication terminal 10 by the DL-SCH (St6). The processing of steps St1 to St6 are performed only once when the communication terminal 10 participates in the radio communication system 100.

When receiving the information transmitted in step St6, the communication terminal 10 sets and manages uplink resource blocks used for transmission of UL transmission user data with the base station 20 based on the information on the uplink resource block on the UL dedicated channel specified by the information. Thus, the communication terminal 10 may transmit UL transmission user data when UL transmission user data is generated, by using the uplink resource block of the UL dedicated channel pre-allocated by the base station 20 (St7 to St8).

In step St7 or step St8, the header area of the UL transmission user data transmitted from the communication terminal 10 to the base station 20 may or may not contain the identification information of the communication terminal 10.

For example, in a case where the identification information of the communication terminal 10 is contained in the header area in the UL transmission user data, when receiving the UL transmission user data, the base station 20 may identify the communication terminal 10 of the transmission source based on the identification information contained in the header area of the UL transmission user data.

On the other hand, even if the identification information of the communication terminal 10 is not contained in the header area in the UL transmission user data, since the base station 20 recognizes the identification information of the communication terminal 10 to which the uplink resource block is allocated on the UL dedicated channel in step St6, when receiving UL transmission user data, the base station 20 may identify the communication terminal 10 of the transmission source by determining which uplink resource block on the UL dedicated channel is used for transmission.

As described above, in the radio communication system 100 according to Embodiment 1, the base station 20 holds, in the memory M2, information on the uplink radio resources that have already been allocated to at least one already connected communication terminal (for example, communication terminal 10) currently connected to perform radio communication using a high frequency with the base station. When receiving a notification of participation in the radio communication system 100 from the new communication terminal 10, the base station 20 allocates unallocated uplink radio resources using a high frequency to the communication terminal 10 based on the information on uplink radio resources. The communication terminal 10 transmits data to the base station 20 by using the allocated uplink radio resources.

Thus, in the case of radio communication using a high frequency band assumed to be used in 5G (5th generation mobile communication system) (for example, at the time of data transmission in which there is a high possibility that a plurality of communication terminals 10 simultaneously transmit to the base station 20), since pre-allocated uplink resource blocks may be received from the base station 20 before data transmission, the radio communication system 100 may support realization of high-speed radio communication that requires real-time performance while achieving both high reliability and low latency. For example, different uplink resource blocks are allocated to the individual communication terminals 10 communicably connected to the base station 20. Therefore, as the reliability of communication can be realized because the probability of occurrence of interference during data transmission (for example, collision of transmitting UE user data) can be significantly reduced and the individual communication terminals 10 can transmit data by the Grant Free Access (GFA), it is possible to eliminate the need for an automatic repeat request (ARQ) or continuous data transmission, thereby realizing low latency communication.

In addition, the base station 20 updates the information on the uplink radio resources according to the allocation of the unallocated uplink radio resources. Thus, the base station 20 may always update the allocation status of uplink radio resources (for example, uplink resource blocks) to the latest state and may appropriately allocate uplink resource blocks to the communication terminal 10 that wants to newly participate in the radio communication system 100.

In addition, the base station 20 may allocate an unallocated uplink radio resource to the communication terminal 10 and may instruct data transmission via the uplink dedicated channel each time. The communication terminal 10 performs data transmission via the uplink dedicated channel. Thus, the communication terminal 10 uses different uplink resource blocks on the uplink dedicated channel for data transmission with base station 20, respectively, for example, as compared with the case where the transmission period and the reception period are set to time division, it is possible to further reduce the latency of data transmission in that it is not necessary to wait for the end of the reception period.

In addition, after uplink radio resources are allocated by the base station 20, the communication terminal 10 transmits data to the base station by the Grant Free Access (GFA). Thus, since the communication terminal 10 may immediately start data transmission when UL transmission user data is generated, by using the uplink resource blocks pre-allocated from the base station 20 without having to perform pre-processing for obtaining permission for transmission prior to data transmission with the base station as in the related art, it is possible to realize low latency communication.

(Modification Example of Embodiment 1)

In Embodiment 1, the base station 20 also allocates limited radio resources (for example, resource blocks) to the communication terminal 10 which is not executing data transmission but is connected to the base station 20. Therefore, for example, if there is the communication terminal 10 that performs little or no data transmission, or if there is the communication terminal 10 that does not transmit data frequently, there is a concern that the utilization of the limited frequency will be greatly impaired. Even if the frequency utilization is low, the above-described concern does not become a big problem when there is a situation such as when the system capacity that can be provided by the radio communication system 100 has room for communication traffic.

Therefore, in the modification of Embodiment 1, in a case where the base station 20 determines that there is the communication terminal 10 satisfying a predetermined resource block release condition, the base station 20 releases the uplink resource block already allocated to the communication terminal 10. In addition, in a case where the base station 20 determines that there is the communication terminal 10 satisfying a predetermined resource block pre-allocation condition, the base station 20 pre-allocates unallocated uplink resource blocks to the communication terminal 10 in the same manner as in Embodiment 1.

The configuration of the radio communication system 100 according to the modification example of Embodiment is the same as the configurations shown in FIGS. 1 and 2, the same components are assigned the same reference numerals to simplify or omit the description, and different contents will be described.

Figure 8:
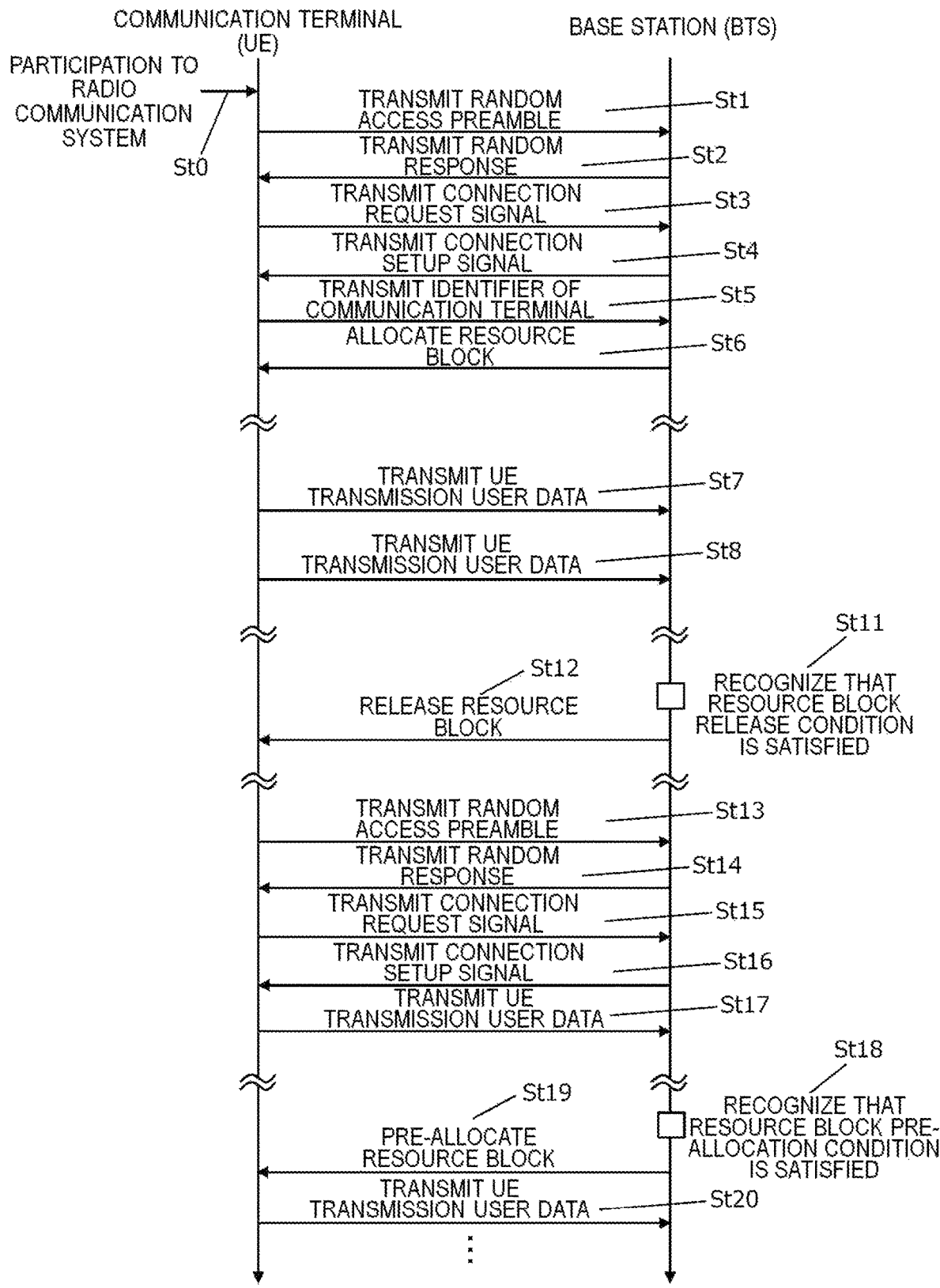
FIG. 8 is a sequence diagram showing examples of operation procedures related to data communication of a communication terminal and a base station according to a modification example of Embodiment 1, in chronological order.

Next, in the radio communication system 100 according to the modification example of Embodiment 1, an operation procedure example at the time of data transmission from the communication terminal 10 to the base station 20 via the uplink will be described with reference to FIG. 8. FIG. 8 is a sequence diagram showing an operation procedure example related to data communication of the communication terminal 10 and the base station 20 according to the modification example of Embodiment 1 in time series. In FIG. 8, the communication terminal is described as "UE" (User Equipment) for convenience, and the base station is described as "BTS" (Base Station). In addition, in the description of FIG. 8, the same step number is assigned to processing that is the same as the processing described in FIG. 7. In order to make the description of FIG. 8 easy to understand, the base station 20 will be described assuming that the uplink resource block on the UL dedicated channel is allocated again to the communication terminal 10 to which the uplink resource block is allocated (see FIG. 4).

In FIG. 8, after step St8, the base station 20 recognizes that at least one communication terminal 10 to which the uplink resource block has already been allocated in step St6 satisfies the predetermined resource block release condition (St11). From the viewpoint of increasing the frequency utilization, the predetermined resource block release condition is a condition for stopping uselessly allocating uplink resource blocks to communication terminals for which data transmission is not frequently performed, releasing the uplink resource blocks, and allocating the uplink resource blocks to communication terminals that need data transmission. The predetermined resource block release condition may be, but is not limited to, for example, the data transmission frequency in a predetermined period (for example, 24 hours) being less than a predetermined value (for example, 3), or no data transmission for at least a predetermined time (for example, 48 hours).

The base station 20 executes release processing of the uplink resource block on the UL dedicated channel that has already been allocated to the communication terminal 10 satisfying the predetermined resource block release condition (St12). The base station 20 transmits an instruction to the effect that release processing of the uplink resource block on the UL dedicated channel has been performed to the corresponding communication terminal 10 (St12).

When the communication terminal 10 receives the instruction from the base station 20, the UL radio resource management unit 5 cancels the usage setting of the uplink resource block on the UL dedicated channel. Therefore, the communication terminal 10 cannot guarantee the URLLC communication as when the uplink resource block on the UL dedicated channel is allocated. Therefore, when transmitting data, the communication terminal 10 executes data transmission after having the base station 20 allocate an uplink resource block according to the random access scheme of the related art.

When transmitting data again, the communication terminal 10 executes processing for having the base station 20 allocate an uplink resource block in the same manner as in the procedures of steps St1 to St4. Specifically, the communication terminal 10 transmits a predetermined random access preamble to the base station 20 by PRACH (St13). When receiving the predetermined random access preamble transmitted by the PRACH, the base station 20 recognizes the presence of the communication terminal 10 that wants to transmit data.

The base station 20 determines which uplink resource block on the UL-SCH to be used for transmission to the communication terminal 10 that has transmitted the predetermined random access preamble in step St13. The base station 20 returns a response message (that is, a random access response) including the information of the uplink resource block on the determined UL-SCH by the DL-SCH (St14).

When receiving the random access response returned in step St14, the communication terminal 10 transmits a connection request signal including identification information of the communication terminal 10 to the base station 20 by the UL-SCH using the uplink resource block on the UL-SCH specified in the random access response (St15).

The base station 20 returns a connection setup signal corresponding to the connection request signal to the communication terminal 10 corresponding to the identification information included in the connection request signal transmitted in step St14 by the DL-SCH (St16).

When UL transmission user data is generated, the communication terminal 10 transmits the UL transmission user data to the base station 20 by using the uplink resource block on the UL-SCH used for the transmission in step St15 (St17). As described above, since each processing of the communication terminal 10 and the base station 20 in steps St13 to St17 is the same as the operation procedure of data transmission by the random access scheme in the related art, it is not guaranteed that the communication terminal 10 executes data transmission realizing URLLC. However, as the frequency of data transmission by the communication terminal 10 increases, the base station 20 can pre-allocate uplink resource blocks on the UL dedicated channel again, assuming that the predetermined resource block pre-allocation condition is satisfied.

After step St17, the base station 20 recognizes that the communication terminal 10 that has repeated data transmission (see steps St13 to St17) using the uplink resource block on the UL-SCH has satisfied the predetermined resource block pre-allocation condition (St18). From the viewpoint of improving frequency utilization efficiency, the predetermined resource block pre-allocation condition is a condition for preferentially allocating an uplink resource block to a communication terminal with a large amount of data transmission. For example, the predetermined resource block pre-allocation condition may be, but is not limited to, the data transmission frequency in a predetermined period (for example, 24 hours) being equal to or higher than a predetermined value (for example, 1).

The base station 20 executes pre-allocation processing to newly allocate an uplink resource block on the UL dedicated channel to the communication terminal 10 that satisfies the predetermined resource block pre-allocation condition (St19). The base station 20 transmits an instruction to the effect that pre-allocation processing of uplink resource blocks on the UL dedicated channel has been performed to the corresponding communication terminal 10 (St19).

When receiving the information transmitted in step St6, the communication terminal 10 sets and manages uplink resource blocks used for transmission of UL transmission user data with the base station 20 based on the information on the uplink resource block on the UL dedicated channel specified by the information. Thus, the communication terminal 10 may transmit UL transmission user data when UL transmission user data is generated, by using the uplink resource block of the UL dedicated channel pre-allocated by the base station 20 (St7 to St8). Therefore, the communication terminal 10 can guarantee the URLLC communication by using the uplink resource block on the UL dedicated channel.

Thus, in the radio communication system 100 according to the modification example of Embodiment 1, the base station 20 releases the allocated uplink radio resources corresponding to the communication terminal 10 according to the determination that the data transmission frequency in a predetermined period from at least one communication terminal 10 of the already connected communication terminals (for example, the communication terminals UE1 to UE5) and the communication terminal UE 6 is less than a predetermined value. Then, the base station 20 updates information on the uplink radio resources.

Thus, since the radio communication system 100 releases uplink resource blocks on the UL dedicated channel in the communication terminal 10 with a particularly low frequency of data transmission among the communication terminals UE1 to UE6 once connected to perform radio communication with the base station 20, it is possible to use the limited frequency effectively.

In addition, the base station 20 may correctly manage allocated and unallocated uplink resource blocks on the UL dedicated channel. For example, the base station 20 reallocates uplink resource block on the UL dedicated channel, which is picked up due to a low frequency of data transmission, to another communication terminal that newly participates in the radio communication system 100 or the like, and therefore it is possible to aim at the effective use of frequencies appropriately.

In addition, in the radio communication system 100 according to the modification example of Embodiment 1, the base station 20 releases the allocated uplink radio resources corresponding to the communication terminal 10 according to the determination that there is no data transmission for at least one of the communication terminals 10 of the already connected communication terminals (for example, the communication terminals UE1 to UE5) and the communication terminal UE6 for a predetermined time or more. Then, the base station 20 updates information on the uplink radio resources.

Thus, since the radio communication system 100 uplink resource blocks on the UL dedicated channel in the communication terminal 10 that has not performed data transmission for a predetermined time or more among the communication terminals UE1 to UE6 once connected to perform radio communication with base station 20, it is possible to use the limited frequency effectively. In addition, the base station 20 may correctly manage allocated and unallocated uplink resource blocks on the UL dedicated channel. For example, the base station 20 reallocates uplink resource block on the UL dedicated channel, which is picked up because data transmission is not performed, to another communication terminal that newly participates in the radio communication system 100 or the like, and therefore it is possible to aim at the effective use of frequencies appropriately.

In addition, according to the determination that the data transmission frequency in a predetermined period from the communication terminal 10 of which the uplink radio resources are released is equal to or higher than a predetermined value, the base station 20 allocates unallocated uplink radio resources corresponding to the communication terminal. In addition, the base station 20 updates information on the uplink radio resources. Thus, the base station 20 pre-allocates uplink resource blocks on the UL dedicated channel again to the communication terminal 10 that has made frequent data transmissions, it is possible to properly use the frequency effectively by preferentially allocating the limited frequency to the communication terminal 10 with many data transmissions. In addition, the base station 20 may correctly manage allocated and unallocated uplink resource blocks on the UL dedicated channel.

Although the embodiments have been described above with reference to the accompanying drawings, the present disclosure is not limited to such examples. It is obvious that those skilled in the art can conceive of various modifications, alterations, substitutions, additions, deletions, and equivalents within the scope of the claims, which are understood to be within the technical scope of the present disclosure. In addition, in the range which does not deviate from the meaning of the invention, each component in the embodiment described above may be arbitrarily combined.

For example, the number of uplink resource blocks pre-allocated to the communication terminal 10 is not limited to one per communication terminal 10, and may be plural. In addition, the uplink resource blocks pre-allocated to the communication terminal 10 may not be uplink resource blocks on only one carrier frequency but may be uplink resource blocks on a plurality of carrier frequencies.

The present disclosure is useful as a radio communication system, a base station and a radio communication method that support realization of high-speed radio communication requiring real-time performance while achieving both high reliability and low latency in radio communication using a high-frequency band.

This application is based on and claims the benefit of the Japanese patent application No. 2018-161635 filed on Aug. 30, 2018, the contents of which are incorporated herein by reference in its entirety.

What is claimed is:

1. A radio communication system configured to support a grant free access (GFA) by a communication terminal to transmit data to a base station, the radio communication system comprising:
   a base station; and
   at least one already connected communication terminal that is configured to perform a radio communication using a high frequency with the base station,
   wherein, the base station holds information on uplink radio resources allocated to the at least one already connected communication terminal, the base station receives a notification of participation in the radio communication system from a new communication terminal, and allocates unallocated uplink radio resources using the high frequency to the new communication terminal based on the information on the uplink radio resources allocated to the at least one already connected communication terminal so as to satisfy: i) at least one terminal is accommodated per approximately one square meters (m²) of a cell coverage area of the base station, and ii) a shorter transmission time period and a shorter reception time period are allocated to the new communication terminal than those time periods used in LTE, and the new communication terminal transmits data to the base station by using the allocated uplink radio resources.

2. The radio communication system according to claim 1, wherein the base station updates the information on the uplink radio resources according to the allocation of the previously unallocated uplink radio resources to the new communication terminal.

3. The radio communication system according to claim 1, wherein the base station allocates the unallocated uplink radio resources to the new communication terminal and instructs the new communication terminal to perform data transmission via an uplink dedicated channel, and the new communication terminal performs the data transmission via the uplink dedicated channel.

4. The radio communication system according to claim 1, wherein, after the uplink radio resources are allocated to the new communication terminal by the base station, the new communication terminal performs the data transmission to the base station by the GFA.

5. The radio communication system according to claim 1, wherein the base station determines whether a data transmission frequency in a defined period from at least one communication terminal of the already connected communication terminal and the new communication terminal is less than a defined value, and the base station releases the allocated uplink radio resources of the at least one communication terminal determined to use the data transmission frequency less than the defined value, and updates the information on the uplink radio resources.

6. The radio communication system according to claim 1, wherein the base station determines whether there is no data transmission from at least one communication terminal of the already connected communication terminal and the communication terminal for a defined time or more, and the base station releases the allocated uplink radio resources of the at least one communication terminal determined to have no data transmission for the defined time or more, and updates the information on the uplink radio resources.

7. The radio communication system according to claim 5, wherein the base station determines whether the data transmission frequency in a second defined period from the at least one communication terminal of which the uplink radio resources are released is equal to or more than a second defined value, and the base station allocates the unallocated uplink radio resources to the at least one communication terminal determined to use the data transmission frequency equal to or more than the second defined value, and updates the information on the uplink radio resources.

8. The radio communication system according to claim 6, wherein the base station determines whether a data transmission frequency in a defined period from the at least one communication terminal of which the uplink radio resources are released is equal to or more than a second defined value, and the base station allocates the unallocated uplink radio resources to the at least one communication terminal determined to use the data transmission frequency equal to or more than the second defined value, and updates the information on the uplink radio resources.

9. The radio communication system according to claim 1, wherein the transmission time period and the reception time period allocated to the new communication terminal are ½ msec or ⅛ msec, which are shorter than 1-msec time periods used in LTE.

10. A base station included in a radio communication system configured to support a grant free access (GFA) by a communication terminal to transmit data to the base station, the base station comprising:

a memory that holds information on uplink radio resources which have been allocated to at least one already connected communication terminal for performing a radio communication using a high frequency with the base station;

a communication circuit that receives a notification of participation in the radio communication system from a new communication terminal; and a radio resource management circuit that allocates unallocated uplink radio resources using the high frequency to the new communication terminal based on the information on the uplink radio resources allocated to the at least one already connected communication terminal so as to satisfy: i) at least one terminal is accommodated per approximately one square meters (m²) of a cell coverage area of the base station, and ii) a shorter transmission time period and a shorter reception time period are allocated to the new communication terminal than those time periods used in LTE, wherein the communication circuit transmits an instruction to the new communication terminal to perform data transmission using the allocated uplink radio resources.

11. The base station according to claim 10, wherein the transmission time period and the reception time period allocated to the new communication terminal are ½ msec or ⅛ msec, which are shorter than 1-msec time periods used in LTE.

12. A radio communication method in a radio communication system including a base station and at least one already connected communication terminal that is configured to perform a radio communication using a high frequency with the base station, the radio communication system supportive of a grant free access (GFA) by a communication terminal to transmit data to the base station, the radio communication method comprising:

by the base station, holding information on uplink radio resources which have been allocated to the at least one already connected communication terminal;

by the base station, receiving a notification of participation in the radio communication system from a new communication terminal;

by the base station, allocating unallocated uplink radio resources using the high frequency to the new communication terminal based on the information on the uplink radio resources allocated to the at least one already connected communication terminal so as to satisfy: i) at least one terminal is accommodated per approximately one square meters (m²) of a cell coverage area of the base station, and ii) a shorter transmission time period and a shorter reception time period are allocated to the new communication terminal than those time periods used in LTE; and by the new communication terminal, transmitting data to the base station by using the allocated uplink radio resources.

13. The radio communication method according to claim 12, wherein the transmission time period and the reception time period allocated to the new communication terminal are ½ msec or ⅛ msec, which are shorter than 1-msec time periods used in LTE.

14. The radio communication method according to claim 12, comprising:
by the base station, updating the information on the uplink radio resources according to the allocation of the previously unallocated uplink radio resources to the new communication terminal.

15. The radio communication method according to claim 12, comprising:
by the base station, allocating the unallocated uplink radio resources to the new communication terminal and instructing the new communication terminal to perform data transmission via an uplink dedicated channel, and
by the new communication terminal, performing the data transmission via the uplink dedicated channel.

16. The communication method according to claim 12, comprising:
by the new communication terminal, performing the data transmission to the base station by the GFA, after the uplink radio resources are allocated to the new communication terminal by the base station.

17. The communication method according to claim 12, comprising:
by the base station, determining whether a data transmission frequency in a defined period from at least one communication terminal of the already connected communication terminal and the new communication terminal is less than a defined value, and by the base station, releasing the allocated uplink radio resources of the at least one communication terminal determined to use the data transmission frequency less than the defined value, and updating the information on the uplink radio resources.

18. The communication method according to claim 17, comprising:
by the base station, determining whether the data transmission frequency in a second defined period from the at least one communication terminal of which the uplink radio resources are released is equal to or more than a second defined value, and
by the base station, allocating the unallocated uplink radio resources to the at least one communication terminal determined to use the data transmission frequency equal to or more than the second defined value, and updating the information on the uplink radio resources.

19. The communication method according to claim 12, comprising:
by the base station, determining whether there is no data transmission from at least one communication terminal of the already connected communication terminal and the communication terminal for a defined time or more, and
by the base station, releasing the allocated uplink radio resources of the at least one communication terminal determined to have no data transmission for the defined time or more, and updating the information on the uplink radio resources.

20. The radio communication method according to claim 19, comprising:
by the base station, determining whether a data transmission frequency in a defined period from the at least one communication terminal of which the uplink radio resources are released is equal to or more than a second defined value, and
by the base station, allocating the unallocated uplink radio resources to the at least one communication terminal determined to use the data transmission frequency equal to or more than the second defined value, and updating the information on the uplink radio resources.

* * * * *